(12) United States Patent
Li et al.

(10) Patent No.: US 8,363,020 B2
(45) Date of Patent: Jan. 29, 2013

(54) METHODS AND APPARATUS FOR PRESSURE-BASED MANIPULATION OF CONTENT ON A TOUCH SCREEN

(75) Inventors: Hao Li, Chandler, AZ (US); Papu Maniar, Mesa, AZ (US); Yi Wei, Chandler, AZ (US); Keshu Zhang, Phoenix, AZ (US); Haifeng Li, Phoenix, AZ (US)

(73) Assignee: Symbol Technologies, Inc., Holtsville, NY (US)

( * ) Notice: Subject to any disclaimer, the term of this patent is extended or adjusted under 35 U.S.C. 154(b) by 654 days.

(21) Appl. No.: 12/549,008

(22) Filed: Aug. 27, 2009

(65) Prior Publication Data

US 2011/0050588 A1 Mar. 3, 2011

(51) Int. Cl.
*G06F 3/041* (2006.01)
(52) U.S. Cl. .................... 345/173; 345/50; 345/104
(58) Field of Classification Search .................. None
See application file for complete search history.

(56) References Cited

U.S. PATENT DOCUMENTS

| | | | |
|---|---|---|---|
| 5,510,813 A | 4/1996 | Makinwa et al. | |
| 5,989,700 A | 11/1999 | Krivopal | |
| 6,492,979 B1 | 12/2002 | Kent et al. | |
| 7,196,694 B2 | 3/2007 | Roberts | |
| 7,331,245 B2 * | 2/2008 | Nishimura et al. | 73/862.046 |
| 7,339,580 B2 | 3/2008 | Westerman et al. | |
| 7,355,594 B2 | 4/2008 | Barkan | |
| 7,355,595 B2 | 4/2008 | Bathiche et al. | |
| 7,499,040 B2 | 3/2009 | Zadesky et al. | |
| 2002/0180763 A1 | 12/2002 | Kung | |
| 2003/0132294 A1 | 7/2003 | Gomez et al. | |
| 2007/0175987 A1 | 8/2007 | Havens et al. | |
| 2007/0229464 A1 | 10/2007 | Hotelling et al. | |
| 2007/0268275 A1 | 11/2007 | Westerman et al. | |
| 2008/0024454 A1 | 1/2008 | Everest | |
| 2008/0029691 A1 | 2/2008 | Han | |
| 2008/0091121 A1 | 4/2008 | Sun et al. | |
| 2008/0165141 A1 | 7/2008 | Christie | |
| 2008/0204426 A1 | 8/2008 | Hotelling et al. | |

(Continued)

FOREIGN PATENT DOCUMENTS

| CA | 2316067 A1 | 2/2002 |
|---|---|---|
| EP | 2000896 | 12/2008 |

(Continued)

OTHER PUBLICATIONS

U.S. Appl. No. 12/548,983, filed Aug. 27, 2009 entitled "Systems and Methods for Pressure-Based Authentication of a Signature on a Touch Screen".
U.S. Appl. No. 12/052,365, filed Mar. 20, 2008 entitled "Transparent Pressure Sensor and Method for Using".

(Continued)

*Primary Examiner* — Muhammad N Edun (57) ABSTRACT

Methods and apparatus are provided for manipulating content displayed on a touch screen utilizing a transparent pressure-sensing touch panel. A method comprises displaying content on the touch screen and obtaining one or more pressure metrics for an input gesture on the transparent pressure-sensing touch panel. Each pressure metric corresponds to pressure (or force) applied to the transparent pressure-sensing touch panel by a respective impression of the input gesture. The method further comprises adjusting the displayed content on the touch screen in response to the input gesture, wherein the displayed content is adjusted based on to the one or more pressure metrics for the input gesture.

20 Claims, 5 Drawing Sheets

U.S. PATENT DOCUMENTS

| | | | |
|---|---|---|---|
| 2008/0211785 | A1 | 9/2008 | Hotelling et al. |
| 2008/0231604 | A1 | 9/2008 | Peterson |
| 2008/0309639 | A1 | 12/2008 | Wei et al. |
| 2009/0189877 | A1 | 7/2009 | Washino et al. |

FOREIGN PATENT DOCUMENTS

| | | |
|---|---|---|
| WO | 0241129 A2 | 5/2002 |
| WO | 03021568 A1 | 3/2003 |
| WO | 2006013485 | 2/2006 |
| WO | 2006017695 A2 | 2/2006 |
| WO | 2009035184 A1 | 3/2009 |

OTHER PUBLICATIONS

Koehly, R., et al., Paper FSRs and Latex/Fabric Traction Sensors: Methods for the Development of Home-Made Touch Sensors, Proceedings of the 2006 International Conference on New Interfaces for Musical Expression (NIME06, Paris, France.

International Search Report and Written Opinion dated Nov. 30, 2010 in related case PCT/US2010/046717.

International Preliminary Report on Patentability and Written Opinion for counterpart International Patent Application No. PCT/US2010/046717 issued on Feb. 28, 2012.

* cited by examiner

METHODS AND APPARATUS FOR PRESSURE-BASED MANIPULATION OF CONTENT ON A TOUCH SCREEN

TECHNICAL FIELD

Embodiments of the subject matter described herein relate generally to touch sensing applications, and more particularly, embodiments of the subject matter relate to manipulating content displayed on the touch screen.

BACKGROUND

Many electronic devices use touch screens (or touch panels) to present information to a user and also receive input from the user. Conventional touch sensing technologies sense the position of touches on a screen. While some touch sensing technologies are able to determine a magnitude of pressure (or force) applied to the touch screen, the pressure is determined based on the area of contact (or the rate of change thereof) on the surface of the touch screen. In this regard, the prior art approximates or extrapolates an estimate of the pressure applied, but does not measure the actual force applied. Furthermore, some capacitive touch screens are responsive to mere proximity to the surface of the touch screen, that is, they may respond or react when in fact no contact or impression has been made on the surface of the touch screen. As a result, prior art systems are not able to accurately measure and resolve the pressure (or force) that is applied against the touch screen to individual locations on the touch screen. Therefore, prior art systems utilize non-intuitive gestures as means for adjusting or otherwise manipulating content on the touch screen independently of the amount of pressure applied to the touch screen.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to touch sensing, touch screen calibration and/or configuration, touch screens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Technologies and concepts discussed herein relate to systems utilizing pressure-sensing (or force-sensing) touch screens, that is, a touch screen capable of measuring and/or resolving the pressure (or force) applied to one or more individual locations on the touch screen to the respective impression locations. The pressure-sensing touch screen is utilized to adjust or otherwise manipulate content displayed on the touch screen in response to an input gesture, that is, one or more impressions on the touch screen. The extent of the adjustment and/or manipulation, that is, the rate and/or amount by which the content is adjusted and/or manipulated, is directly proportional to the pressure (or force) applied for the input gesture, such that an increase in the pressure (or force) applied with the input gesture increases the extent of the adjustment and/or manipulation. In an exemplary embodiment, the touch screen comprises a transparent touch panel that is responsive to pressure (or force) applied to the touch panel by any object, such as, for example, a stylus, pointer, pen, a finger and/or hand, a fingernail, or another suitable object.

Figure 1:
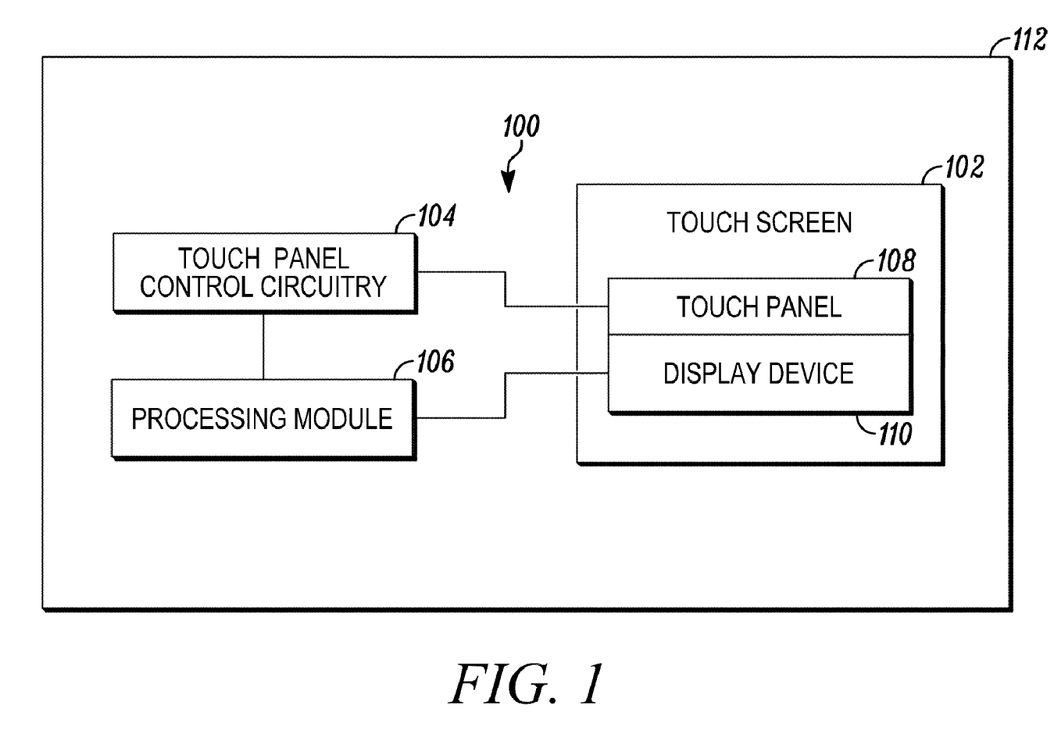
FIG. 1 is a block diagram of a display system in accordance with one embodiment.

FIG. 1 depicts a display system 100 suitable for use with an electronic device 112, such as, a computer, a mobile device (e.g., cellular phone, personal digital assistant, and the like), or another suitable electronic device. In an exemplary embodiment, the display system 100 includes, without limitation, a touch screen 102, touch panel control circuitry 104, and a processing module 106. It should be understood that FIG. 1 is a simplified representation of a display system 100 for purposes of explanation and is not intended to limit the scope of the subject matter in any way.

In an exemplary embodiment, the touch screen 102 comprises a touch panel 108 and a display device 110. The touch panel 108 is coupled to the touch panel control circuitry 104, which, in turn, is coupled to the processing module 106. The processing module 106 is coupled to the display device 110, and the processing module 106 is configured to control the display and/or rendering of content on the display device 114 and correlates information received from the touch panel control circuitry 104 with the content displayed on the display device 110, as described in greater detail below.

In an exemplary embodiment, the touch panel 108 is realized as a transparent touch panel that is responsive to a pressure (or force) applied to one or more locations on the touch panel 108. In this regard, the touch panel 108 is pressure-sensitive (or force-sensitive) and may be utilized to determine the magnitude of pressure (or force) applied to the touch panel 108 at the impression locations that comprise an input gesture on the touch screen 102 and resolve the pressure (or force) to the respective impression locations on the touch panel 108, as described in greater detail below. The touch panel 108 is preferably disposed proximate the display device 110 and aligned with respect to the display device 110 such that the touch panel 108 is interposed in the line-of-sight between a user and the display device 110 when the user views content displayed on the touch screen 102 and/or display device 110. In this regard, from the perspective of a user and/or viewer of the touch screen 102 and/or display device 110, at least a portion of the touch panel 108 overlaps and/or overlies content displayed on the display device 110. In accordance with one embodiment, the touch panel 108 is substantially planar in shape and disposed adjacent to a substantially planar surface of the display device 110, as described in greater detail below.

Figure 2:
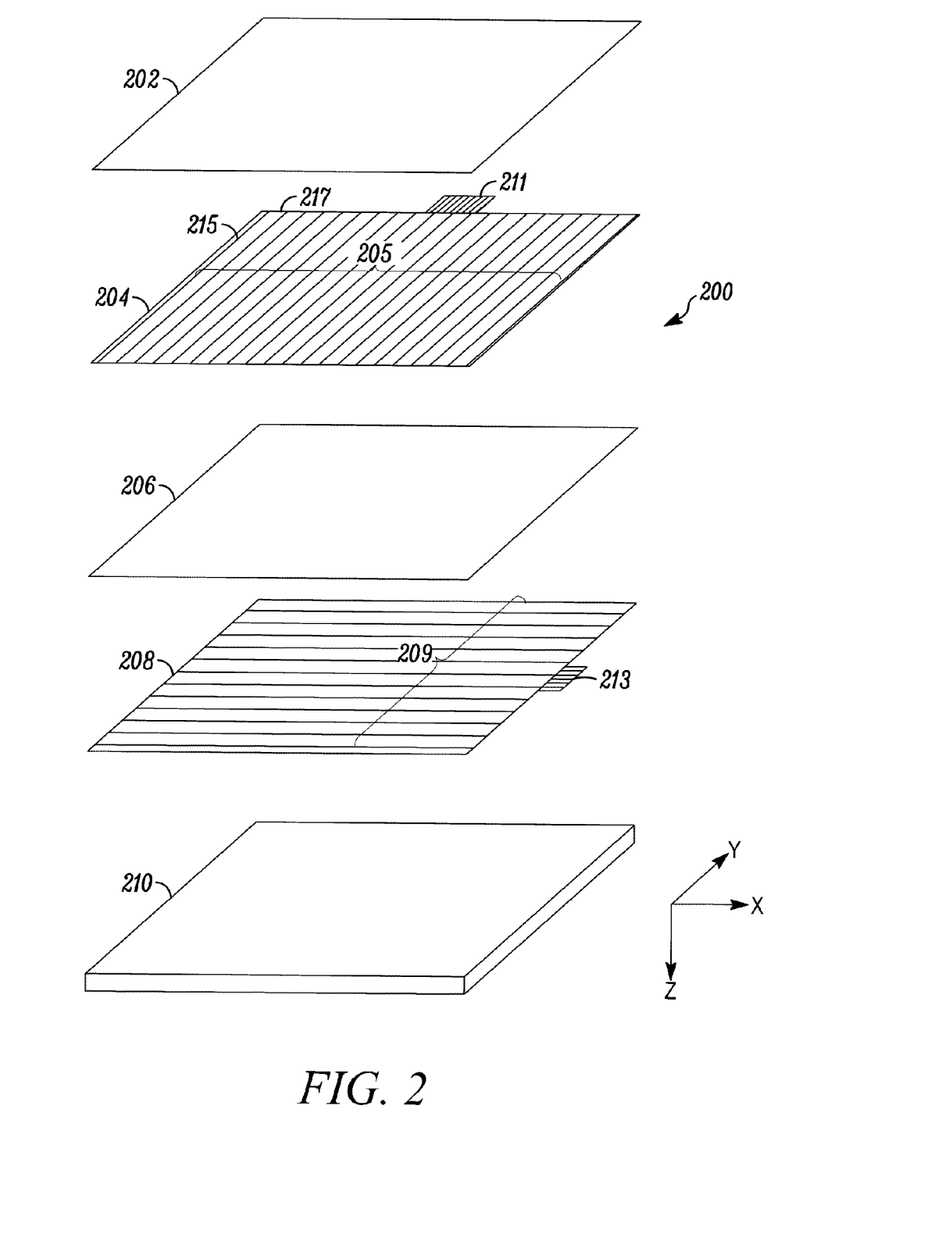
FIG. 2 is an exploded perspective view of a touch panel suitable for use in the display system of FIG. 1 in accordance with one embodiment.

FIG. 2 depicts an exploded view of a transparent touch panel 200 suitable for use as the touch panel 108 in the touch screen 102 of FIG. 1 in an exemplary embodiment. The touch panel 200 includes, without limitation, a transparent protective layer 202, a first transparent electrode layer 204, a transparent composite layer 206, a second transparent electrode layer 208, and a transparent substrate 210. The transparent protective layer 202 comprises a transparent protective material, such as glass or a polymer, which is disposed over the first transparent electrode layer 204. In an exemplary embodiment, the transparent substrate 210 is realized as a rigid material, such as, for example, glass or a polymer, however in alternative embodiments, the transparent substrate 210 may be realized as a flexible material. As described in greater detail below, in an exemplary embodiment, the transparent composite layer 206 is interposed between the transparent electrode layers 204, 208.

In an exemplary embodiment, each of the transparent electrode layers 204, 208 is realized as a patterned layer having a plurality of transparent conductive traces 205, 209, with each conductive trace being electrically coupled to a tab 211, 213 for providing an electrical connection to other circuitry. In this regard, in accordance with one embodiment, the tabs 211, 213 are coupled to the touch panel control circuitry 104 of FIG. 1. In an exemplary embodiment, the transparent conductive traces 205, 209 are realized as a transparent conductive oxide, such as, indium tin oxide, zinc oxide, or tin oxide. The second transparent electrode layer 208 is deposited on the transparent substrate 210 with the conductive traces 209 being aligned in a first direction. For example, as shown in FIG. 2, the conductive traces 209 are aligned with and/or parallel to the x-axis. The first transparent electrode layer 204 is deposited on the transparent composite layer 206 with its conductive traces 205 being aligned orthogonal to the conductive traces 209 of the second transparent electrode layer 208. For example, as shown in FIG. 2, the conductive traces 205 are aligned with and/or parallel to the y-axis.

By virtue of the orthogonal orientation of the conductive traces 205, 209, the transparent electrode layers 204, 208 produce a plurality of possible conducting paths from conductive traces 205 of the first transparent electrode layer 204 through the transparent composite layer 206 to conductive traces 209 of the second electrode layer 208 at each location where the conductive traces 205, 209 are overlapping and/or overlying along the z-axis. In this regard, the transparent electrode layers 204, 208 produce an m×n array (or matrix) of potential conducting paths through the transparent composite layer 206, where m is the number of rows of conductive traces 209 of the second electrode layer 208 and n is the number of columns of conductive traces 205 of transparent electrode layer 204. For example, in accordance with one embodiment, the second electrode layer 208 comprises 24 conductive traces 209 and the first transparent electrode layer 204 comprises 32 conductive traces 205 resulting in a 24×32 array of potential conducting paths.

In an exemplary embodiment, the transparent composite layer 206 is realized as a resilient material with transparent conductive (or semiconductive) particles uniformly dispersed within the material. For example, depending on the embodiment, the transparent composite layer 206 may comprise a transparent elastomeric matrix, such as, polyester, phenoxy resin, polyimide, or silicone rubber, with transparent conductive or semiconductive particles such as indium tin oxide, zinc oxide, or tin oxide dispersed within the material.

When pressure (or force) is applied to the surface of the touch panel 200 and/or transparent protective layer 202 (e.g., in the positive z-direction), the transparent composite layer 206 is compressed, thereby reducing the average distance between adjacent conductive particles dispersed within the transparent composite layer 206 underlying that particular location. In other words, the conductive paths formed by networks of adjacent particles increase in density (also known as percolation), thus increasing the conductance (or decreasing the resistance) of the transparent composite layer 206 between overlapping conductive traces of transparent electrode layer 204, 208 at the location(s) corresponding to the pressure applied to the touch panel 200 and/or transparent protective layer 202 (e.g., the impression location). Thus, a heavier force (or pressure) applied to the touch panel 200 and/or transparent protective layer 202 in the positive z-direction results in greater compression of the transparent composite layer 206, and thereby, a greater increase in conductivity (or decrease in resistance) of the transparent composite layer 206 at the particular impression location. In this manner, the transparent composite layer 206 acts as a variable resistance that is electrically in series with each conducting path between transparent electrode layers 204, 208, wherein the amount of resistance for a respective conducting path is directly related to the magnitude of the pressure (or force) applied to the touch panel 200 at the location corresponding to the respective conducting path (i.e., the location overlying the conducting path along the z-axis). As described in greater detail below, the resistance (or the change thereof) is measured or otherwise determined for each conducting path of the plurality of conducting paths, that is, each location of the m×n array, to determine the pressure (or force) applied to the surface of the touch panel 200 and/or transparent protective layer 202 at the locations on the touch panel 200 and/or transparent protective layer 202 corresponding to the respective conducting path (e.g., overlying along the z-axis). As described in greater detail below, based on the resistance (or the change thereof) for each conducting path, a pressure (or force) metric for each conducting path is obtained, wherein the pressure (or force) metric is indicative of the magnitude of the pressure (or force) applied to the touch panel 200 and/or transparent protective layer 202 overlying the respective conducting path.

Referring again to FIG. 1 with continued reference to FIG. 2, in an exemplary embodiment, the touch panel 108, 200 is integral with the display device 110 to provide a pressure-sensing (or force-sensing) touch screen 102. For example, if the display device 110 has a substantially planar viewing area, the touch panel 108, 200 and/or transparent substrate 210 may be aligned parallel to the planar viewing area of the display device 114. In an exemplary embodiment, the touch panel 108, 200 and display device 114 are separated by less than about 10 millimeters, however, in some embodiments, the touch panel 108, 200 may be directly adjacent to (or in contact with) the display device 114 (e.g., a negligible separation distance). The display device 114 is realized as an electronic display configured to graphically display information and/or content under control of the processing module 106. Depending on the embodiment, the display device 114 may be realized as a liquid crystal display (LCD), a cathode ray tube display (CRT), a light emitting diode (LED) display, an organic light emitting diode (OLED) display, a plasma display, or a projection display, or another suitable electronic display.

Referring again to FIG. 1, with continued reference to FIG. 2, the touch panel control circuitry 104 generally represents the hardware, software, and/or firmware components of the display system 100 which are configured to detect, measure or otherwise determine the resistance (or change thereof) for each conducting path of the plurality of conducting paths of the touch panel 108, 200, that is, each location where conductive traces 205, 209 of the touch panel 108, 200 overlap to create a conducting path through the transparent composite layer 206. In this regard, the touch panel control circuitry 104 is configured to scan each conducting path (e.g., each location of the m×n array), for example, by applying a reference voltage (or current) to a first conductive trace 215 of the first transparent electrode layer 204 and measuring the voltage (or current) at each conductive trace 209 of the second electrode layer 208 while maintaining the reference voltage applied to the first conductive trace 215. The measured voltage (or current) for each conductive trace 209 of the second electrode layer 208 depends on the resistance of the transparent composite layer 206 between first conductive trace 215 of the first transparent electrode layer 204 and the respective conductive trace 209 of the second electrode layer 208. In this manner, the touch panel 108, 200 is pressure-sensing (or force-sensing) because the measured voltage (or current) directly relates to the pressure (or force) applied to the touch panel 108, 200 overlying (e.g., along the z-axis) the overlap of the first conductive trace 215 of the first transparent electrode layer 204 and the respective conductive trace 209 of the second electrode layer 208. After measuring the voltage (or current) for each conductive trace 209 of the second electrode layer 208 in response to the applying the reference voltage to the first conductive trace 215, the touch panel control circuitry 104 applies the reference voltage to a second conductive trace 217 of the first transparent electrode layer 204, and while maintaining the reference voltage applied to the second conductive trace 217, measures the voltage (or current) of each conductive trace 209 of the second electrode layer 208, and so on until the voltage (or current) has been measured for each possible conducting path.

After measuring the voltage (or current) for each conducting path of the plurality of possible conducting paths, the touch panel control circuitry 104 converts the measured voltages (or currents) to corresponding pressure (or force) metrics which are indicative of the magnitude of the pressure (or force) applied to the touch panel 108, 200 by an impression overlying the respective conducting path. The touch panel control circuitry 104 generates a pressure map (or pressure matrix) which maintains the association and/or correlation between pressure metrics and their corresponding location on the touch panel 108, 200 (e.g., the location of the conducting path for the respective pressure metric). In this regard, the pressure map may comprise m×n array (or matrix) corresponding to the conducting paths of the touch panel 108, 200, wherein each entry of the m×n array is a pressure metric based on the resistance (or change thereof) at the particular location of the touch panel 108, 200. In this manner, the touch panel control circuitry 104 and touch panel 108, 200 are cooperatively configured to obtain pressure metrics that correspond to the pressure (or force) applied to the touch panel 108, 200 and/or touch screen 102 and resolve the pressure metrics to respective impression locations, that is, the location of the conducting path underlying (e.g., in the direction of the z-axis) the location where pressure (or force) is applied to the touch panel 108, 200. In an exemplary embodiment, the touch panel control circuitry 104 is configured to generate the pressure map at a rate of about 20 Hz to 200 Hz and provide the pressure map to the processing module 106, as described in greater detail below. Thus, each pressure map reflects the state of the pressure (or force) applied to the touch panel 108, 200 at a particular instant in time.

Figure 3:
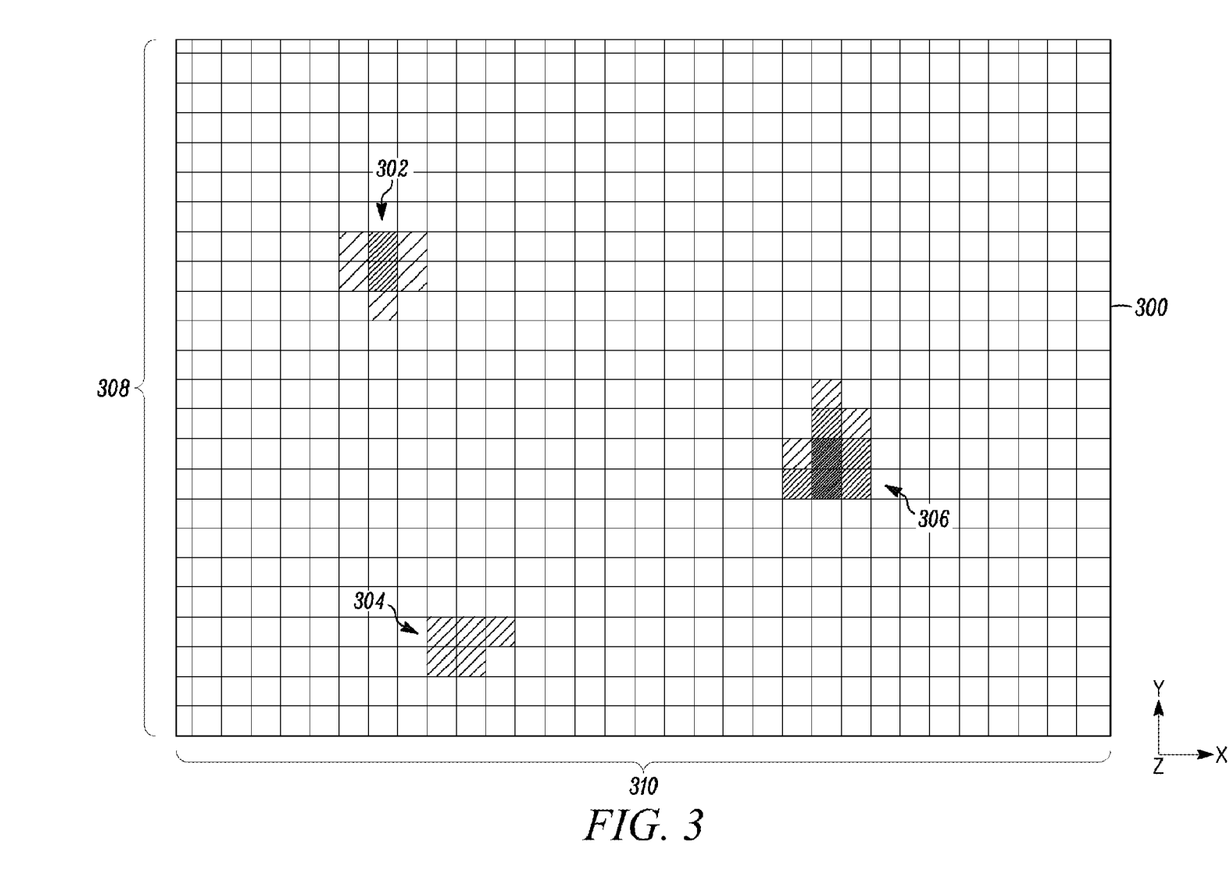
FIG. 3 depicts a pressure map in response to an input gesture on a touch screen suitable for use with the display system of FIG. 1 in accordance with one embodiment.

FIG. 3 depicts a pressure map in response to an input gesture comprising a plurality of impressions 302, 304, 306 upon a touch panel 300 (or touch screen). The pressure map corresponds to the state of the input gesture on the touch panel 300, that is, the one or more impression locations and their corresponding pressure metrics, at a particular instant in time. For example, if the touch panel control circuitry 104 captures pressure maps at a rate of 60 Hz, each pressure map represents the state of the impression(s) on the touch screen 102 and/or touch panel 108, 200 every sixtieth of a second.

As shown in FIG. 3, the pressure map is realized as an array comprising 24 rows of cells 308 and 32 columns of cells 310. In this regard, the touch panel 300 may be realized as a transparent pressure-sensing touch panel, such as the touch panel 200 of FIG. 2, wherein the rows of cells 308 correspond to the rows of conductive traces of the touch panel that are aligned along the x-axis (e.g., conductive traces 209) and the columns of cells 310 correspond to columns of conductive traces of the touch panel aligned along the y-axis (e.g., conductive traces 205). In this regard, each cell corresponds to a conducting path where conductive traces are overlying along the z-axis, wherein the shading of each cell corresponds to the magnitude of the pressure (or force) applied to the touch panel 300 in the direction of the z-axis overlying the respective conducting path. Thus, in the illustrated embodiment of FIG. 3, the first impression 302 reflects or otherwise corresponds to a pressure applied to the touch panel 300 that is greater than the pressure applied to the touch panel 300 by a second impression 304 but less than the pressure applied to the touch panel 300 by a third impression 306. As shown in FIG. 3, in practice, an impression 302, 304, 306 on the touch panel 300 may overlap multiple conducting paths of the touch panel 300 resulting in multiple impression locations being detected by the touch panel 300 and/or display system 100. In this regard, the processing module 106 may determine the respective location and pressure value for each impression 302, 304, 306 by interpolating the two-dimensional (x, y) location information along with the measured pressure values for the respective impression 302, 304, 306. If an impression location changes from a first pressure map to a second pressure map, the processing module 106 may assign a direction to the particular impression based on the change in location. As described in greater detail below, the direction to the impression(s) that comprise the input gesture may be utilized to determine the manner in which content displayed on a touch screen should be adjusted and/or manipulated, while the extent of the adjustment and/or manipulation is based on the pressure (or force) applied to the touch panel 300 by the impression(s).

The processing module 106 generally represents the hardware, software, and/or firmware components configured to correlate an input gesture on the touch screen 102 and/or touch panel 108 with content displayed on the touch screen 102 and/or display device 110 and perform additional tasks and/or functions described in greater detail below. Depending on the embodiment, the processing module 106 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing module 106 may also be implemented as a combination of computing devices, e.g., a combination of a digital signal processor and a microprocessor, a plurality of microprocessors, one or more microprocessors in conjunction with a digital signal processor core, or any other such configuration. In practice, the processing module 106 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processing module 106, or in any practical combination thereof.

Figure 4:
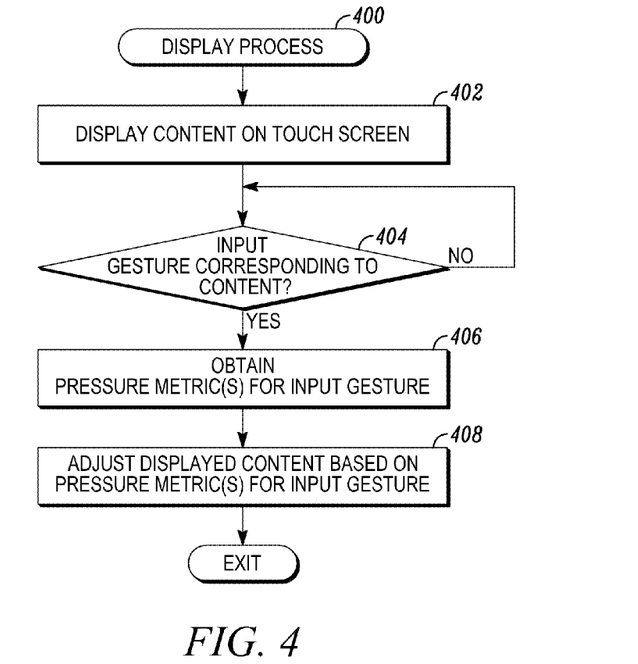
FIG. 4 is a flow diagram of a display process suitable for use with the display system of FIG. 1 in accordance with one embodiment.

Referring now to FIG. 4, in an exemplary embodiment, a display system may be configured to perform a display process 400 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the touch screen 102, touch panel 108, 200, touch panel control circuitry 104, and/or processing module 106. It should be appreciated any number of additional or alternative tasks may be included, and may be incorporated into a more comprehensive procedure or process having additional functionality not described in detail herein.

Figure 5:
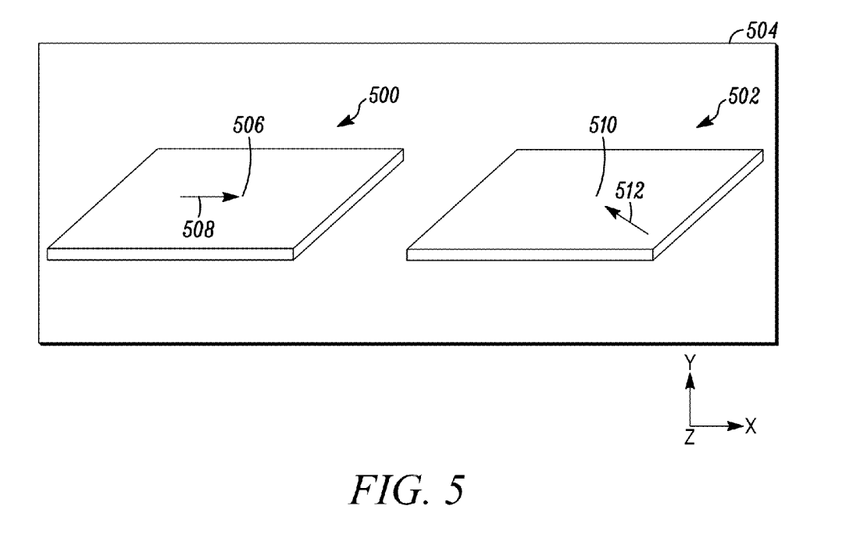
FIG. 5 and FIG. 6 illustrate manipulation of content displayed on a touch screen in accordance with one embodiment of the display process of FIG. 4.

Referring to FIG. 4, and with continued reference to FIGS. 1-3, a display process 400 may be performed to enable a user to adjust or otherwise manipulate content displayed on a touch screen in response to an input gesture on the touch screen in a manner that accounts for the pressure (or force) applied to the touch screen by the user when making the input gesture. The display process 400 begins by displaying graphical content on the touch screen (task 402). The graphical content displayed on the display device 110 may be associated with an application, program, or other software being executed by the processing module 106, as will be appreciated in the art. The graphical content may be two-dimensional, such as, for example, a graphical user interface element, such as application windows, menus, buttons, icons, and the like, a graphical representation of a book, map, or another document, or two-dimensional animation, artwork, or object. Alternatively, the graphical content may be three-dimensional, such as, for example, one or more graphical objects or three-dimensional animation or artwork. For example, as shown in FIG. 5, the processing module 106 may display three-dimensional objects 500, 502 on a touch screen 504 (e.g., touch screen 102 and/or display device 110). It should be appreciated that although the subject matter may be described herein in the context of graphical objects for purposes of explanation, the subject matter is not intended to be limited to the type of graphical content being displayed and/or adjusted.

Referring again to FIG. 4, and with continued reference to FIGS. 1-3 and FIG. 5, in an exemplary embodiment, the display process 400 continues by detecting an input gesture corresponding to the graphical content displayed on the touch screen (alternatively, the displayed content) (task 404). In an exemplary embodiment, the processing module 106 determines the input gesture corresponds to the displayed content based on the location(s) of the impression(s) that comprise the input gesture, for example, by correlating the impression location(s) from a pressure map obtained from the touch panel control circuitry 104 with the location of the displayed content on the display device 110. In this regard, the processing module 106 may determine an input gesture and/or impression corresponds to the displayed content when the location of the impression overlies at least a portion of the displayed content on the display device 110. For example, referring to again to FIG. 5, the processing module 106 may determine an input gesture corresponds to a displayed object 500, 502 when an impression of the input gesture overlies the respective object 500, 502. In another embodiment, if the displayed content occupies or is otherwise rendered in a window on the display device 110, the processing module 106 may determine the input gesture corresponds to the displayed content when the impression(s) of the input gesture overlies the window containing the displayed content.

In an exemplary embodiment, the display process 400 continues by obtaining or otherwise determining one or more pressure metrics for the input gesture (task 406). In this regard, the processing module 106 obtains, via the touch panel control circuitry 104, a pressure metric for each impression on the touch panel 108 that comprises the input gesture. As described above in the context of FIG. 2, the pressure metric corresponds to the pressure (or force) applied, by the user, to the touch panel 108, 200 and/or touch screen 102 at the impression location(s). In an exemplary embodiment, the display process 400 continues by adjusting and/or manipulating the displayed content in response to the input gesture, wherein the displayed content is adjusted and/or manipulated based on the input gesture and in proportion to the pressure applied to the touch screen by the user when making the input gesture (task 408). In this regard, based upon the input gesture, the display process 400 determines or otherwise identifies the characteristic(s) (e.g., position, orientation, perceived depth) or manner in which the displayed content is to be manipulated or otherwise adjusted. As described in greater detail below, a received input gesture may be mapped to a particular adjustment, manipulation and/or action based upon the location and/or direction of the impression(s), the number of impressions comprising the input gesture, and/or the duration of the impression(s). For example, if the input gesture comprises an impression moving laterally (e.g., in the xy-plane) on the touch screen 102 and/or touch panel 108, 200, the processing module 106 may determine that the displayed content should be moved or otherwise repositioned laterally. It should be appreciated that the particular functionality mapped to an input gesture will vary depending on the particular application and/or the type of displayed content. In this manner, the input gesture prescribes the characteristic and/or manner in which the displayed content is adjusted, while the pressure metrics associated with the input gesture prescribe the extent of the adjustment and/or manipulation, that is, the rate and/or the amount by which the displayed content is adjusted and/or manipulated, as described in greater detail below. In an exemplary embodiment, the extent of the adjustment and/or manipulation is directly proportional to the pressure metrics of the input gesture, such that a relative increase in the pressure (or force) applied to the touch panel 108, 200 and/or touch screen 102 by the input gesture increases the extent of the adjustment and/or manipulation and relative decrease in the pressure (or force) applied to the touch panel 108, 200 and/or touch screen 102 by the input gesture decreases the extent of the adjustment and/or manipulation.

In accordance with one embodiment, in response to an input gesture comprising an impression on the touch panel 108, 200 and/or touch screen 102, having non-negligible lateral movement (e.g., movement in the xy-plane) that overlaps and/or overlies the displayed content, the processing module 106 determines the displayed content should be moved, panned, scrolled, or otherwise adjusted laterally (e.g., in the xy-plane), wherein the rate and/or amount of the lateral adjustment is proportional to the pressure metric for the impression (e.g., the pressure applied to the touch panel 108, 200 and/or touch screen 102 in the positive z-direction by the impression).

Figure 6:
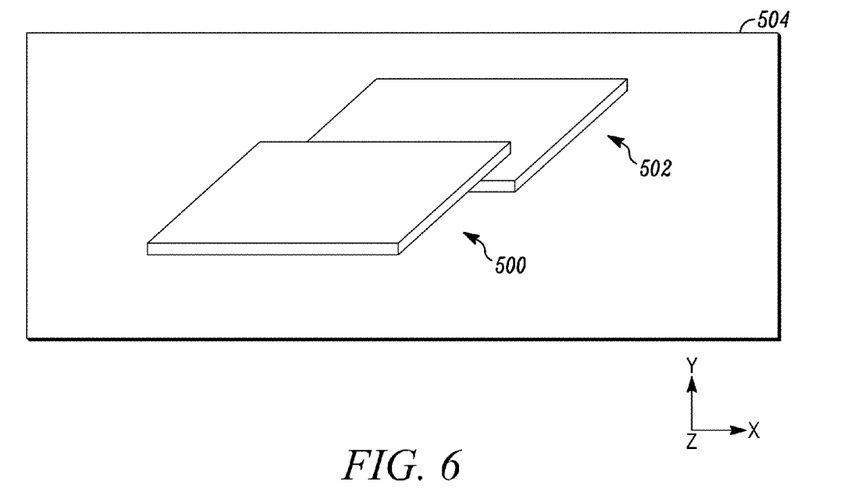

For example, referring now to FIG. 5 and FIG. 6, with continued reference to FIGS. 1-4, a display system 100 may perform the display process 400 to enable a user to manipulate one or more objects 500, 502 displayed on a touch screen 504 (e.g., touch screen 102 and/or display device 110). The processing module 106 may display the objects 500, 502 on the touch screen 504 with each object 500, 502 having an initial perceived depth (or zoom factor), an initial center location, and an initial orientation (e.g., task 402). In response to an input gesture comprising an impression on the touch panel 108, 200 and/or touch screen 102, 504 and having non-negligible lateral movement (i.e., movement in the xy-plane) that overlaps and/or overlies the object 500, the processing module 106 may determine the object 500 should be moved, panned, scrolled, or otherwise adjusted laterally (i.e., in the xy-plane) (e.g., tasks 404, 406, 408). For example, in response to an input gesture on the touch screen 502 comprising an impression at a location 506 overlying the object 500 and in the positive x-direction (indicated by arrow 508), the processing module 106 adjusts the lateral position of the object 500, for example, by moving or otherwise repositioning the center location of the object 500 in the positive x-direction as shown in FIG. 6. The rate and/or amount by which the center location of the object 500 is adjusted in the x-direction is directly proportional to the magnitude of the pressure metric (or pressure applied) at the impression location 506, such that an increase in the pressure applied to the touch panel 108, 200 by a user when making the input gesture 506, 508 will increase the rate and/or amount by which the center location of the object 500 is adjusted in the x-direction. In a similar manner, the object 500 may be adjusted laterally in the y-direction. An object 502 (or other displayed content) may also be moved, panned, scrolled, or otherwise adjusted laterally in a compound direction in the xy-plane. For example, in response to an impression at a location 510 overlying the object 502 and in a compound direction (indicated by arrow 512), the center location of the second object 502 may be adjusted in a compound direction, as shown in FIG. 6. In a similar manner, the touch panel 108, 200 and/or touch screen 102 may be utilized to intuitively pan, scroll or otherwise progress through other displayed content (e.g., maps, web pages, documents) at a rate and/or by an amount corresponding to the pressure applied to the touch panel 108, 200 and/or touch screen 102.

Referring again to FIG. 4 and with continued reference to FIGS. 1-3 and FIGS. 5-6, in accordance with another embodiment, the perceived depth or zoom factor of the displayed content may be adjusted based upon the magnitude of the pressure (or force) applied to the touch panel 108, 200 and/or touch screen 102. For example, if the input gesture comprises a single impression on the touch panel 108, 200 and/or touch screen 102 with little or no lateral movement (i.e., an impression in the z-direction with negligible movement in the xy-plane), the processing module 106 determines that the perceived depth of the displayed content in the z-direction should be decreased, that is, the zoom factor for the displayed content should be increased such that the displayed content is perceived by a user as having moved nearer the viewing surface of the touch screen 102 and/or display device 110 (e.g., in the negative z-direction), as will be appreciated in the art. If the input gesture comprises two impressions on the touch panel 108, 200 and/or touch screen 102 with little or no lateral movement (e.g., impressions in the z-direction with negligible movement in the xy-plane), the processing module 106 may determine that the perceived depth of the displayed content in the z-direction should be increased, that is, the zoom factor for the displayed content should be decreased such that the displayed content appears to have moved farther from the viewing surface of the touch screen 102 and/or display device 110 (e.g., in the positive z-direction), as will be appreciated in the art.

Referring now to FIGS. 5 and 6, and with continued reference to FIGS. 1-4, in accordance with one embodiment, the relative depth of displayed objects 500, 502 on the touch screen 102, 502 corresponds to the magnitude of the pressure (or force) applied to the touch panel 108, 200 and/or touch screen 102, 504 when manipulating or otherwise adjusting the position of the objects 500, 502. For example, when the input gesture comprises two distinct impressions 506, 510 concurrently applied to the touch screen 504, if the impression 510 corresponding to the second object 502 has a pressure metric that is greater than the pressure metric for the impression 506 corresponding to the first object 500, then the perceived depth of the second object 502 is increased (i.e., in the positive z-direction) relative to the first object 500, such that the second object 502 is perceived as being further into the touch screen 102, 504 and/or display device 110 as shown in FIG. 6. In this manner, the objects 500, 502 may be intuitively stacked or otherwise manipulated three-dimensionally using the touch screen 102, 504.

Figure 7:
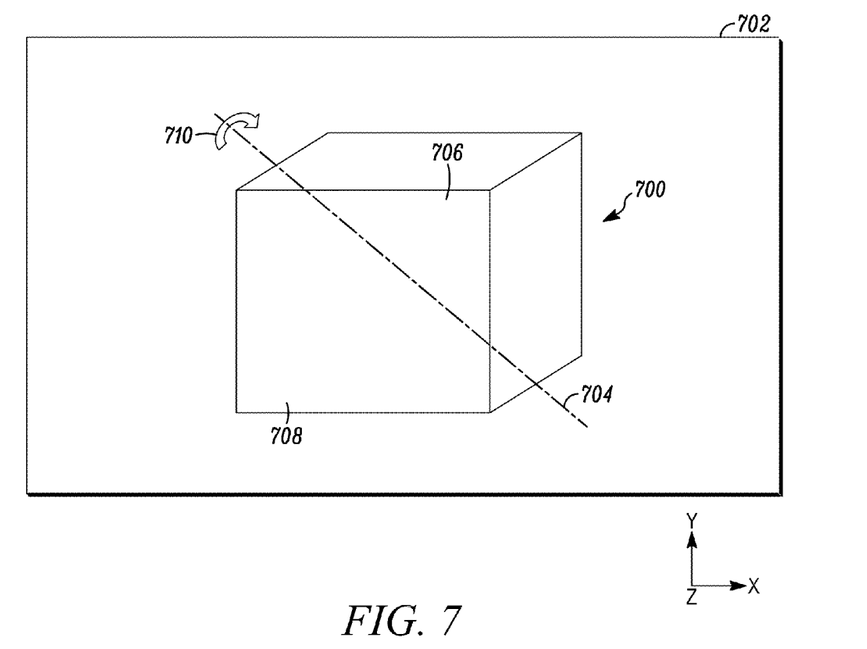
FIG. 7 illustrates manipulation of content displayed on a touch screen in accordance with another embodiment of the display process of FIG. 4.

Referring now to FIG. 7, and with continued reference to FIGS. 1-4, in accordance with another embodiment, in response to an input gesture comprising multiple impressions 706, 708 concurrently applied to a touch screen 702 (e.g., touch screen 102 and/or touch panel 108, 200), the processing module 106 may determine the displayed content, such as an object 700, should be rotated or otherwise adjusted about an axis of rotation 704. In an exemplary embodiment, the processing module 106 determines the axis of rotation based on the impression locations, the direction of the impression at each impression location, and the pressure metric (or pressure applied) at each impression location. For example, the axis of rotation 704 of FIG. 7 may be determined in response to a first impression 706 primarily in the z-direction overlying one corner or edge of the object 700 and a second impression 708 primarily in the z-direction overlying the opposing corner and/or edge of the object 700. The processing module 106 determines the direction of rotation (indicated by arrow 710) about the axis of rotation 704 based on the difference between the pressure (or force) applied to at the respective impression locations 706, 708 such that the object 700 rotates in the direction of the greater pressure (or force). In this regard, when the pressure metric for the first impression 706 is greater than the pressure metric for the second impression 708 (or alternatively, when the difference between the pressure metric for the first impression 706 and the pressure metric for the second impression 708 is positive), the processing module 106 rotates the object 700 about the axis of rotation 704 in the direction 710 of the first impression 706. Conversely, if the pressure metric for the first impression 706 were less than the pressure metric for the second impression 708, the processing module 106 would rotate the object 700 about the axis of rotation 704 in the direction of the second impression 708 (e.g., opposite direction 710). It should be appreciated that FIG. 7 is a simplified representation of object rotation, and in practice, the displayed content on the touch screen may be rotated about any axis of rotation in response to an input gesture depending on the number of impressions, the pressure metrics for the respective impressions, and the direction and/or location of the respective impressions.

Referring again to FIG. 4, and with continued reference to FIGS. 1-3, in yet another embodiment, the display process 400 determines or otherwise identifies an action associated with the received input gesture based on the amount of pressure (or force) applied and the duration of the input gesture. In this regard, the touch panel 108, 200 and/or touch screen 102 may implement functionality traditionally implemented using a computer mouse or another comparable user interface device by mapping the input gesture to a particular action or function based on the amount of pressure (or force) applied, the duration the pressure (or force) is applied, and the number of impressions that comprise the input gesture. For example, if the input gesture comprises an impression having a pressure metric corresponding to an applied force greater than about two newtons, the display process 400 may treat the input gesture as a left-click on the displayed content if the duration of the impression is less than about 0.5 seconds. If the input gesture comprises two impressions and at least one impression has a pressure metric corresponding to an applied force greater than about two newtons, the display process 400 may treat the input gesture as a right-click on the displayed content if the duration of the impression is less than about 0.5 seconds. Conversely, if the input gesture comprises one or more impression(s) having pressure metrics corresponding to an applied force of less than about two newtons, the display process 400 may determine the input gesture does not correspond to a mouse function, but rather another type of gesture for adjusting and/or manipulating content (e.g., panning, zooming, scrolling, or the like) as described above. It will be appreciated that any number of actions and/or functionality may be implemented using the touch panel 108, 200 and/or touch screen 102. The mapping of input gestures described herein is provided for purposes of explanation, and in practice, numerous combinations for mapping actions and/or functionality to input gestures are possible.

To briefly summarize, one advantage of the systems and/or methods described above is that the pressure-sensing (or force-sensing) touch screen allows a user to intuitively adjust or otherwise manipulate the graphical content displayed on the touch screen. The transparent pressure-sensing touch panel is utilized to obtain pressure metrics based on a change in resistance and/or conductivity which is directly related to pressure applied to the touch panel, such that the transparent pressure-sensing touch panel is used to effectively measure the pressure applied to the touch screen. The transparent pressure-sensing touch panel resolves a pressure applied by an input gesture to individual pressure metrics associated with individual impressions, such that the pressure applied by each impression influences the manner in which the displayed graphical content is adjusted and/or manipulated.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for using a touch screen display including a transparent pressure-sensing touch panel, the method comprising:
displaying content on the touch screen display, resulting in displayed content;
obtaining one or more pressure metrics for an input gesture on the transparent pressure-sensing touch panel of the touch screen display, each pressure metric corresponding to pressure applied to the transparent pressure-sensing touch panel by a respective impression of the input gesture; and
adjusting the displayed content on the touch screen display in response to the input gesture, wherein the displayed content is adjusted based on to the one or more pressure metrics for the input gesture.

2. The method of claim 1, the transparent pressure-sensing touch panel including a transparent composite layer, wherein the method further comprises determining the one or more pressure metrics for the input gesture based on resistance of the transparent composite layer underlying the respective impression of the input gesture, wherein the resistance of the transparent composite layer underlying the respective impression of the input gesture corresponds to the pressure applied to the transparent pressure-sensing touch panel by the respective impression.

3. The method of claim 1, wherein:
displaying content on the touch screen display comprises displaying a first object on the touch screen display;
obtaining one or more pressure metrics comprises obtaining a first pressure metric for a first impression of the input gesture corresponding to the first object; and
adjusting the displayed content comprises manipulating the first object on the touch screen display in a manner that is influenced by the first pressure metric.

4. The method of claim 3, wherein:
displaying content on the touch screen display further comprises displaying a second object on the touch screen display;
obtaining one or more pressure metrics further comprises obtaining a second pressure metric for a second impression of the input gesture corresponding to the second object, the first impression and the second impression being concurrent; and adjusting the displayed content further comprises manipulating the second object on the touch screen display, wherein the second object is manipulated proportionally to the second pressure metric.

5. The method of claim 4, wherein:

manipulating the first object on the touch screen display comprises adjusting a perceived depth of the first object such that the perceived depth of the first object corresponds to the first pressure metric; and manipulating the second object on the touch screen display comprises adjusting a perceived depth of the second object such that the perceived depth of the second object corresponds to the second pressure metric.

6. The method of claim 1, wherein adjusting the displayed content comprises laterally adjusting the displayed content at a rate corresponding to the magnitude of the one or more pressure metrics for the input gesture, such that an increase in the pressure applied to the transparent pressure-sensing touch panel increases the rate at which the displayed content is laterally adjusted.

7. The method of claim 1, wherein adjusting the displayed content comprises laterally adjusting the displayed content by an amount corresponding to the magnitude of the one or more pressure metrics for the input gesture, such that an increase in the pressure applied to the transparent pressure-sensing touch panel increases the amount by which the displayed content is laterally adjusted.

8. The method of claim 1, wherein adjusting the displayed content comprises adjusting a perceived depth of the displayed content in proportion with the pressure applied to the transparent pressure-sensing touch panel.

9. The method of claim 1, wherein adjusting the displayed content comprises rotating the displayed content on the touch screen display.

10. The method of claim 1, further comprising identifying a characteristic of the displayed content to be adjusted based on the input gesture, wherein the characteristic is adjusted in accordance with the magnitude of the one or more pressure metrics for the input gesture.

11. The method of claim 1, the input gesture comprising a first impression and a second impression concurrently applied to the transparent pressure-sensing touch panel, wherein:

determining the one or more pressure metrics comprises:
determining a first pressure metric for the first impression; and
determining a second pressure metric for the second impression; and adjusting the displayed content comprises adjusting the displayed content based on the first pressure metric and the second pressure metric.

12. The method of claim 11, further comprising determining an axis of rotation for the displayed content based on the first impression and the second impression, wherein adjusting the displayed content comprises rotating the displayed content about the axis of rotation based on a difference between the first pressure metric and the second pressure metric.

13. A device comprising:
a touch screen display comprising:
a display device configured to display graphical content;
a transparent pressure-sensing touch panel aligned with respect to the display device such that at least a portion of the transparent pressure-sensing touch panel overlaps at least a portion of the graphical content displayed on the display device; and
a processing module coupled to the touch screen display, wherein the processing module and the touch screen display are cooperatively configured to adjust graphical content displayed on the display device in response to a pressure applied to the transparent pressure-sensing touch panel, wherein the extent of the adjustment corresponds to the pressure applied to the transparent pressure-sensing touch panel.

14. The device of claim 13, wherein the transparent pressure-sensing touch panel comprises a transparent composite layer, wherein resistance of the transparent composite layer is influenced by the pressure applied to the transparent pressure-sensing touch panel.

15. The device of claim 14, further comprising:
a first transparent electrode layer disposed on the transparent composite layer; and
a second transparent electrode layer, the transparent composite layer being disposed on the second transparent electrode layer, wherein the processing module and the touch screen display are cooperatively configured to determine the pressure applied to the transparent pressure-sensing touch panel based on the resistance of the transparent composite layer between the first transparent electrode layer and the second transparent electrode layer.

16. The device of claim 13, wherein the transparent pressure-sensing touch panel comprises a resilient material having transparent conductive particles dispersed within the resilient material.

17. A method for using a touch screen display, the touch screen display comprising a transparent touch panel aligned in a line-of-sight with respect to a display device of the touch screen display, the transparent touch panel including a transparent composite layer, the method comprising:

displaying an object on the display device of the touch screen display;

determining pressure applied to the transparent touch panel by a first impression based on a change in a conductivity of the transparent composite layer underlying the first impression, the conductivity of the transparent composite layer being influenced by the pressure applied to the transparent touch panel by the first impression; and manipulating the object on the display device in response to the first impression, wherein the extent of the manipulation is influenced by the pressure applied to the transparent touch panel by the first impression.

18. The method of claim 17, further comprising determining pressure applied to the transparent touch panel by a second impression, wherein manipulating the object on the display device comprises manipulating the object based on the first impression and the second impression, the extent of the manipulation is based on the pressure applied by the first impression and the pressure applied by the second impression.

19. The method of claim 18, wherein manipulating the object on the display device comprises rotating the object on the display device based on a difference between the pressure applied by the first impression and the pressure applied by the second impression.

20. The method of claim 17, wherein manipulating the object on the display device in response to the first impression comprises repositioning the object on the display device, wherein the rate at which the object is repositioned is proportional to the pressure applied by the first impression.

* * * * *

UNITED STATES PATENT AND TRADEMARK OFFICE
CERTIFICATE OF CORRECTION

PATENT NO.        : 8,363,020 B2
APPLICATION NO.   : 12/549008
DATED             : January 29, 2013
INVENTOR(S)       : Li et al.

It is certified that error appears in the above-identified patent and that said Letters Patent is hereby corrected as shown below:

In the Specifications

In Column 9, Line 64, delete "they-direction." and insert -- the y-direction. --, therefor.

Signed and Sealed this
Twenty-eighth Day of May, 2013

Teresa Stanek Rea
*Acting Director of the United States Patent and Trademark Office*